United States Patent
Asghari et al.

(10) Patent No.: US 7,475,727 B2
(45) Date of Patent: Jan. 13, 2009

(54) METHODS OF IMPROVING CONFORMANCE CONTROL IN FRACTURED HYDROCARBON RESERVOIRS

(75) Inventors: Koorosh Asghari, Regina (CA); Ryan Wilton, Regina (CA)

(73) Assignee: University of Regina, Regina, Saskatchewan (CA)

( * ) Notice: Subject to any disclaimer, the term of this patent is extended or adjusted under 35 U.S.C. 154(b) by 123 days.

(21) Appl. No.: 11/198,350

(22) Filed: Aug. 8, 2005

(65) Prior Publication Data
US 2006/0027367 A1    Feb. 9, 2006

Related U.S. Application Data

(60) Provisional application No. 60/599,051, filed on Aug. 6, 2004.

(51) Int. Cl.
*E21B 33/138*    (2006.01)
*E21B 43/321*    (2006.01)
(52) U.S. Cl. .................. 166/294; 166/270; 166/295; 166/300; 507/271; 507/903
(58) Field of Classification Search .............. 166/270, 166/281, 294, 295, 300; 507/225, 271, 903; 523/130
See application file for complete search history.

(56) References Cited

U.S. PATENT DOCUMENTS

| | | | |
|---|---|---|---|
| 2,747,670 A | | 5/1956 | King et al. |
| 3,658,131 A | | 4/1972 | Biles |
| 3,762,476 A | | 10/1973 | Gall |
| 3,805,893 A | | 4/1974 | Sarem |
| 3,871,452 A | | 3/1975 | Sarem |
| 3,933,204 A | * | 1/1976 | Knapp .................. 166/295 |
| 3,981,363 A | | 9/1976 | Gall |
| 4,039,029 A | | 8/1977 | Gall |
| 4,494,606 A | * | 1/1985 | Sydansk .................. 166/295 |
| 4,561,502 A | * | 12/1985 | Norton et al. ............ 166/270 |
| 4,643,255 A | * | 2/1987 | Sandiford et al. ......... 166/295 |
| 4,683,949 A | | 8/1987 | Sydansk et al. |

* cited by examiner

*Primary Examiner*—George Suchfield
(74) *Attorney, Agent, or Firm*—Fasken Martineau DuMoulin LLP

(57) ABSTRACT

Three methods for improving the blocking ability of gels by improving the performance of gels in fractured reservoirs are provided. First method utilizes overload of a crosslinker, the second method utilizes a combination of crosslinker overload and aged crosslinker, and the third method utilizes a step of crosslinker pre-flush. These methods may be combined to further improve the performance of gels in fractured reservoirs. All methods utilized Chromium (III) acetate as a crosslinker. These methods outperformed the base formula of Chromium/polymer typically used in the field.

14 Claims, 4 Drawing Sheets

Gelation time for overloaded gel prepared with one month aged solution of chromium acetate Matrix Outlet Fracture Inlet Figure 3. Gelation time for overloaded gel prepared with one month aged solution of chromium acetate

METHODS OF IMPROVING CONFORMANCE CONTROL IN FRACTURED HYDROCARBON RESERVOIRS

The invention described herein is entitled to the benefit of and claims priority to U.S. patent application Ser. No. 60/599,051 filed on Aug. 6, 2004, the entirety of which is herein incorporated by reference.

FIELD OF THE INVENTION

This invention relates to the field of Petroleum Engineering. More specifically, it relates to methods of conformance control in fractured reservoirs by enhancing the performance of partially crosslinked polyacrylamide polymers using Chromium (III) acetate overload, aging, and pre-flush mechanisms.

BACKGROUND OF THE INVENTION

Many reservoirs currently under production suffer from excessive water within the production well. Excess water may enter a production well by a natural water source (e.g. aquifer) where the presence of high permeability zones in the reservoir provides pathways for water to bypass oil-bearing regions and break through into the production wells. Similarly, excess water may enter a production well as a result of production methodologies such as waterflooding the reservoir where water is pumped into a production well to displace any remaining oil in the reservoir matrix after the primary stages of oil production. Areas of the reservoir that are fractured, either naturally or hydraulically, are excellent pathways for floodwater to penetrate and consequently bypass oil bearing pore spaces.

Conformance, with respect to water in oil reservoirs, is the degree to which water sweeps a reservoir uniformly. Conformance problems are created when water does not sweep a reservoir uniformly and lead to excess water production, a reduction in the productive well life, and increase lifting costs inter alia. In general, poor conformance exists in a fractured reservoir due to the very large permeability of fractures compared to the matrix with a result being that an excessive amount of water is produced in the production well. Handling and separating water from produced oil from such wells imposes an economic constraint for oil producers. Furthermore, the presence of fractures impacts the conformance of water and other fluids during injection process negatively. In U.S. Pat. No. 3,762,476 to Gall, it is stated that many oil wells produce a gross effluent containing 80 to 98 percent by volume of water and only 2 to 20 percent by volume oil.

Blocking the highly permeable thief zones thereby diverting water towards the unswept regions of the reservoir has been proposed and used by oil producers as a viable remedy for this problem. In particular, in-depth gel placement is the most widely used technique for blocking highly permeable zones of reservoirs. This technique has been implemented through many field trials around the world and researchers have studied the mechanisms governing this process in porous media.

Previous researchers have proposed processes based on sequential injection of chemical agents to improve the conformance of water in porous media. U.S. Pat. Nos. 3,805,893 and 3,871,452 to Sarem are examples of such processes. In these patents, improved performance is achieved by sequential injection of a chemical, such as dilute alkaline metal silicate solution, followed by another chemical reagent, such as calcium or magnesium. There have since been various improvements to the above process. For instance, U.S. Pat. No. 3,658,131 to Biles describes the use of a slug of fresh water in the above mention process. Similarly, U.S. Pat. No. 2,747,670 to King, et al discloses a similar process based on sequential injection of a brine solution followed by fresh water, followed by a dilute alkali solution. All the above processes are based on injecting inorganic chemicals into reservoirs sequentially. As a result of the chemical reaction, precipitation will occur which would block the highly permeable regions of the reservoir.

In another series of investigations, researchers have tried to improve the Residual Resistance Factor (RRF) for gel systems placed in fractures. In U.S. Pat. No. 4,683,949 to Sydansk, conformance improvement is achieved in a subterranean hydrocarbon-bearing formation using a gel comprised of a high molecular weight water-soluble acrylamide polymer, a chromium III/carboxylate complex capable of crosslinking the polymer, and an aqueous solvent. The gel components are combined at the surface and injected into the desired treatment zone via a wellbore to form a continuous single-phase gel.

In U.S. Pat. No. 3,762,476 to Gall, a method has been provided by injecting a first polymer solution, following this with a crosslinking ionic solution, a brine slug, and then a second polymer solution, after which the injections are terminated. In this method the injected polymer solution is not previously crosslinked.

U.S. Pat. No. 3,981,363 to Gall provides an improvement to the above mentioned method by improving RRF for blocking fractures by injecting into the formation a first partially crosslinked polymer solution, followed by injecting crosslinking agents, and thereafter injecting a second aqueous partially crosslinked polymer solution that is capable of being gelled by the crosslinking agents.

In U.S. Pat. No. 4,039,029 to Gall, a process is provided for reducing the water permeability near wells that have been previously treated with partially gelled or ungelled polymer and from which oil has been produced for a period of time subsequent to the treatment. The retreatment is made by injecting into the formation an ionic solution capable of crosslinking residual ungelled polymer in the formation, and thereafter injecting an aqueous solution of polymer capable of being crosslinked by the ionic solution.

The invention described herein relates to enhancing polymer gel treatments for the purpose of improving conformance and sweep efficiency problems during production and/or injection processes. Although gel placement in fractures is a common practice in the field, continual improvement in the performance of this technique is required. Previous work (Ganguly, S. 2000. Effect of Leak-off on Behavior of Cr (III)-PHPA gel in Fractured Media. PhD dissertation, University of Kansas, Lawrence, Kans.) in the area of gel placement has shown that diffusion of the crosslinker from the gelant placed in the fracture occurs to thin brine films at the fracture face and adjacent matrix. This molecular diffusion of the crosslinker has a significant impact on the performance of the gel within the fracture. All documents referred to herein are incorporated by reference.

STATEMENT OF THE INVENTION

It is an object of the invention to enhance the blocking ability of gels in fractures. Accordingly, there is provided a method of enhancing the blocking ability of gels by improving the performance of partially crosslinked polyacrylamide polymers using Chromium (III) acetate overload. There is also provided a method of enhancing the blocking ability of gels by improving the performance of partially crosslinked polyacrylamide polymers using Chromium (III) acetate pre-flush. There is also provided a method of enhancing the blocking ability of gels by improving the performance of partially crosslinked polyacrylamide polymers using Chromium (III) acetate aging. There is also provided a method of enhancing the blocking ability of gels by improving the performance of partially crosslinked polyacrylamide polymers using a combination of Chromium (III) acetate overload, aging, and pre-flush methods.

The application of the new methods proposed yield significant improvements in RRF. RRF can be defined as the ratio of brine mobility before gel placement to the mobility of brine after gel placement. High values of RRF indicate significant channel blockage. The methods of present invention result in greater sweep efficiency and improved conformance during waterflood, as well as, greater success rate for gels placed within fractured reservoirs.

DETAILED DESCRIPTION OF THE PREFERRED EMBODIMENTS

Traditionally polymer and crosslinker solutions are mixed together at certain concentrations and injected into the fracture to form gel in-situ. However, all the experiments conducted have shown that no effective gel was formed in fractures. This has been attributed to the diffusion of the crosslinker into the matrix. As a result, the concentration of crosslinker drops to levels that are too low to permit gelation. Because of this problem, the standard practice in industry is to pre-form the gel at the surface before injecting it into the reservoir. However, this method leads to very high injection pressures that, in many cases, make it impractical to conduct the gel placement.

In a first method disclosed herein, crosslinker concentrations of 600 ppm to 1500 ppm (compared to the regular amount required of 300 ppm), are added to the polymer solution at the surface. This crosslinker overload compensates for the loss of crosslinker to the matrix due to diffusion. Hence, the concentration of crosslinker in the gelling solution will remain high long enough for gelation reaction to take place, forming a strong gel in the fracture. The mixture of polymer and crosslinker is injected into reservoir as soon as they are mixed, and the injected solution remains in the liquid state and can be injected deep into the reservoir without reaching prohibitively large pressure drops.

In a second method, the above crosslinker overload method is combined with the method of aging the crosslinker.

In a third method, crosslinker is injected into the fracture prior to injecting the gelling solution (i.e. mixture of polymer and crosslinker). In this crosslinker pre-flush method, some of the injected crosslinker enters the adjacent matrix and fills the nearby pore volume with the crosslinker solution. Subsequently, when gelling solution is injected into the fracture, there will be no diffusion of crosslinker from the fracture into the adjacent matrix. Hence, the concentration of crosslinker in the gelling solution will remain high, allowing the gelation reaction to take place, forming a strong gel in fracture. In this method, the solutions are injected immediately upon mixing, and the mixture remains in the liquid state for deep injection into the reservoir without reaching prohibitively large pressure drops.

EXAMPLE 1

Chromium (III) Acetate Overload Method

The base (1×) gel system used in this and other examples had a final composition of 7500 ppm HPAM (hydrolyzed polyacrylamide, Alcoflood 935, Ciba Chemicals, MW ~7×10$^6$ Daltons and 30% hydrolysis), 300 ppm Cr (III) acetate (McGean-Rhoca Inc.), and 0.75% NaCl in distilled water. The chromium solution was added to the polymer solution while stirring at 300 rpm for 5 minutes to ensure uniform mixing. The gelation time of the 1× formulation was approximately 7 h at 30° C. All gel systems were placed within the fracture and allowed to mature for 3 days at 30° C.

Figure 1:
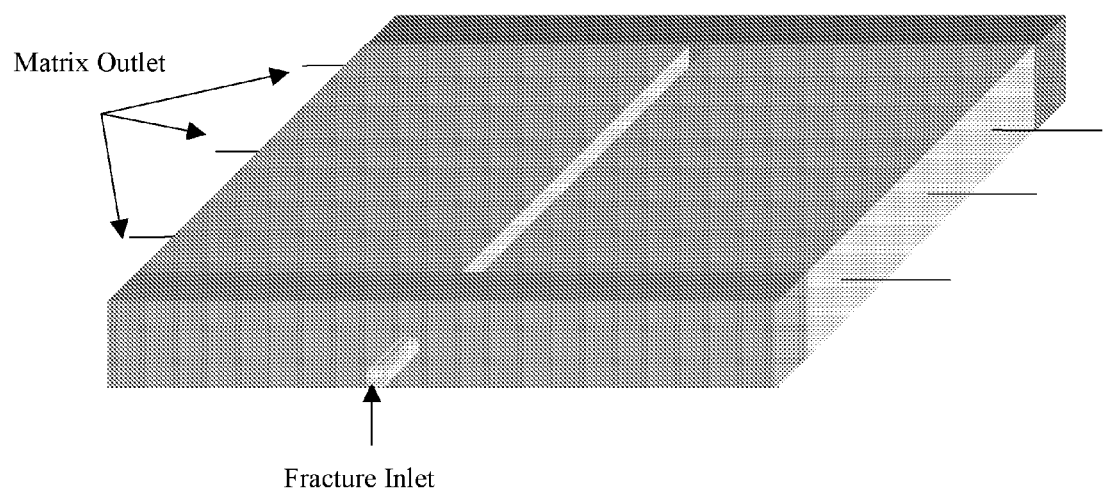
FIG. 1 is a schematic diagram of an apparatus for use in experimental testing of the gelation methods described herein.

Slabs of Berea sandstone were used as the fractured media. The original Berea slabs of 8 in.×12 in×1 in. (length×width× height) were cut into 8 in.×2.5 in.×1 in. (length×width× height) slabs for the overload and aging experiments and 8 in×3 in×1 in (length×width×height) for the pre-flush experiments. Once the slabs were cut, the two sides containing the fracture were spaced with sticks of 0.55 mm thickness and were set in place using an epoxy resin. The inlet and outlet end caps were made of acrylic and were also attached to the slabs with adhesive resin before the top and bottom faces were covered with epoxy resin. Once the epoxy has solidified, three holes were drilled along the matrix edges and were fitted with one-eighth inch (0.125 in.) outer diameter tubing to allow for matrix effluent collection and matrix flushing. A schematic of the apparatus is shown in FIG. 1.

For all examples, the apparatus was vacuumed for at least 5 hours and then saturated with brine. Fracture permeability was calculated from the following modified Darcy flow equation:

$$k_f = \frac{q\mu L}{wh\Delta P} \quad (1)$$

where q is the flow rate, µ is the viscosity of the fluid injected into the fracture, L is the length of the fracture, w is the width of the fracture, h is the height of the fracture and ΔP is the pressure drop imposed during injection. The fracture permeability to brine is determined in order to calculate the residual resistance factors (RRF) for each experiment. The permeability reduction is expressed in terms of RRF which can be defined as the ratio of the brine mobility before gel placement to the mobility of brine after the placement of the gel system. Since the viscosities of brine remain unchanged, this becomes a ratio of the permeabilities.

$$F_{rr} = \frac{k_{before\ gel\ placement}}{k_{after\ gel\ placement}} \quad (2)$$

In this method, chromium overload was investigated as a means to compensate for the amount of chromium diffused to the matrix. By injecting a gelant with a higher concentration of Cr (III) acetate, the amount of $Cr^{3+}$ that diffused into the matrix was insignificant and substantial $Cr^{3+}$ remained in the fracture to properly form the gel. This method involved placement of gel with a fixed amount of polymer. However, cross linker (chromium (III) acetate) concentration was increased to 2×, 3× and 5× the base concentration. A stronger gel was obtained by increasing the crosslinker concentration alone.

A 1% brine solution was injected through the fracture and the matrix in order to determine the average fracture and matrix permeability. Utilizing a modified Darcy flow equation, the permeabilities were found to be ~11,000 D and ~10 Md, respectively. The base (1×) gel used was as described above. Overload gels contained 2×, 3× and 5× the base amount of chromium (III) acetate, while the polymer concentration remained constant. Approximately 10 fracture volumes (10 FV) of the gel solution were injected into the fracture. Excess gel was rinsed from the outlets with 1% brine. The gel was allowed to mature for 3 days at 30° C. before 1% brine injection commenced. Flow rates were sequentially increased from 5 mL/min to 20 mL/min and RRF values were determined at each flow rate. RRF values for 1×, 2×, 3× and 5× gel systems made with fresh chromium (III) acetate were obtained to investigate the impact of increasing crosslinker concentration on gel performance.

Table 1 clearly shows that a stable gel was not formed with the 1× gel system. However, as the crosslinker concentration was increased, greater and greater RRF values were obtained indicating stronger gel formation. Thus, gel performance in fractures can be enhanced by crosslinker concentration overload.

TABLE 1

| Gel Composition | RRF @ 5 mL/min | RRF @ 10 mL/min | RRF @ 20 mL/min |
|---|---|---|---|
| 1X | 1 | 1 | 1 |
| 2X | 56 | 49 | 28 |
| 3X | 93 | 57 | 34 |
| 5X | 228 | 151 | 80 |

EXAMPLE 2

Combined Chromium (III) Acetate Overload and Chromium (III) Acetate Age Method

Figure 2:
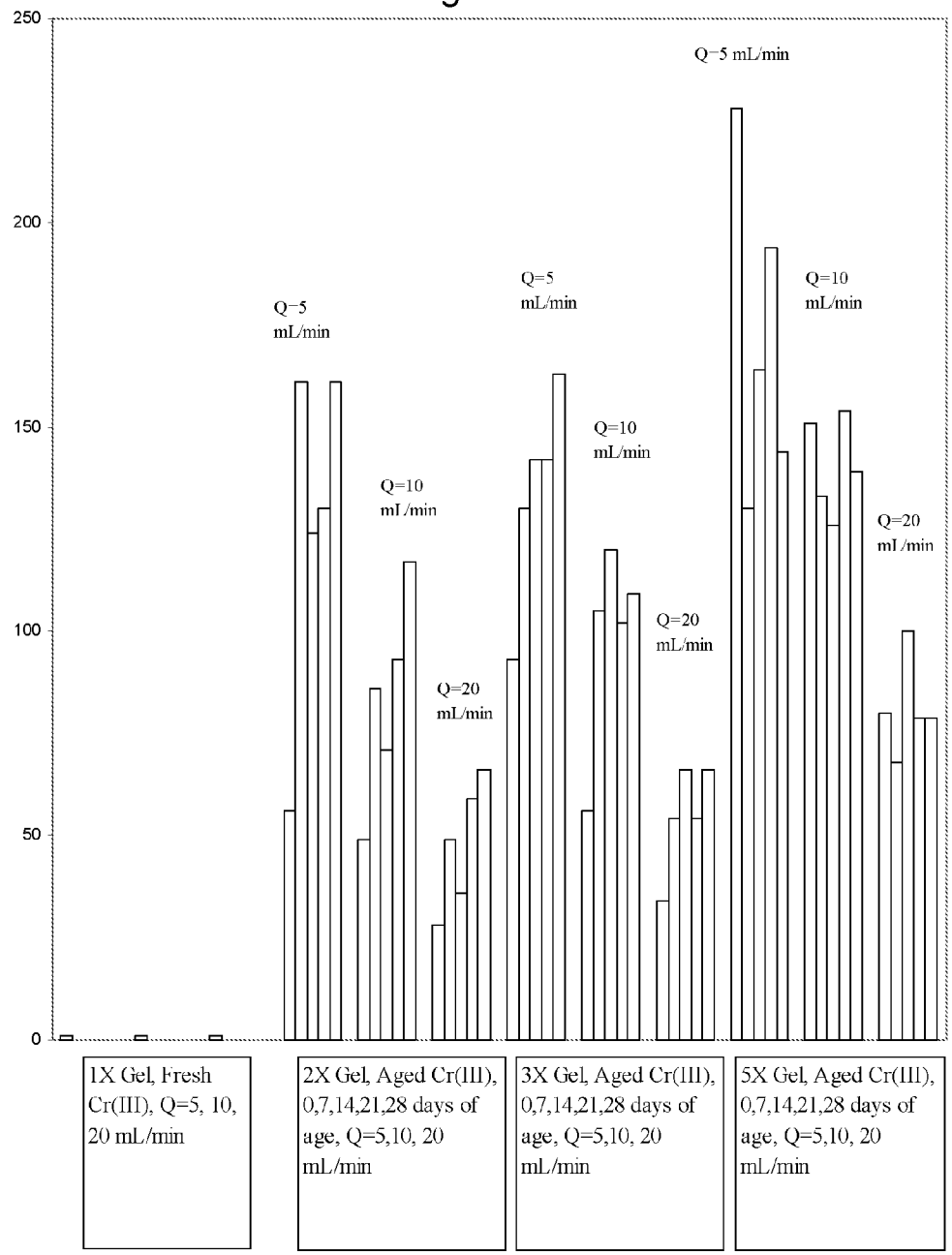
FIG. 2 is a graphical representation of a crosslinker overload gelation process in accordance with one embodiment of the invention.
Figure 3:
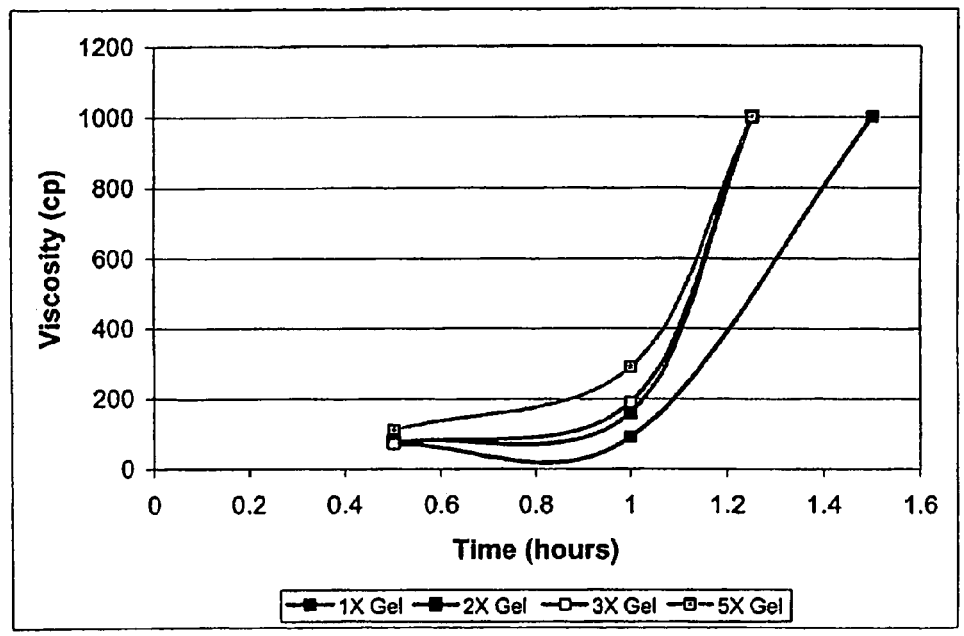
FIG. 3 is a graphical representation of an aged crosslinker overload gelation process in accordance with an embodiment of the invention.

Gel performance in fractures is further enhanced by combining the method of crosslinker concentration overload with crosslinker aging effects. Through a series of experiments the gelation time of overload gels prepared with fresh chromium solution and one month aged chromium solution were studied. The gelation time in these experiments was determined by measuring the viscosity of gelling solution with time. FIG. 2 presents the results of gelation time for an overload gel prepared with fresh chromium solution, while FIG. 3 presents the results for the same experiments conducted with aged chromium. When the gel is formed, its viscosity becomes very high. FIG. 2 shows a gelation time in the range of 4-6 hours for various degrees of chromium overload for fresh chromium solution whereas FIG. 3 shows a reduced gelation time of just over one hour for various degrees of chromium overload for aged chromium solution. These results show that the gelation time is reduced when aged chromium is used to prepare gel.

Figure 4:
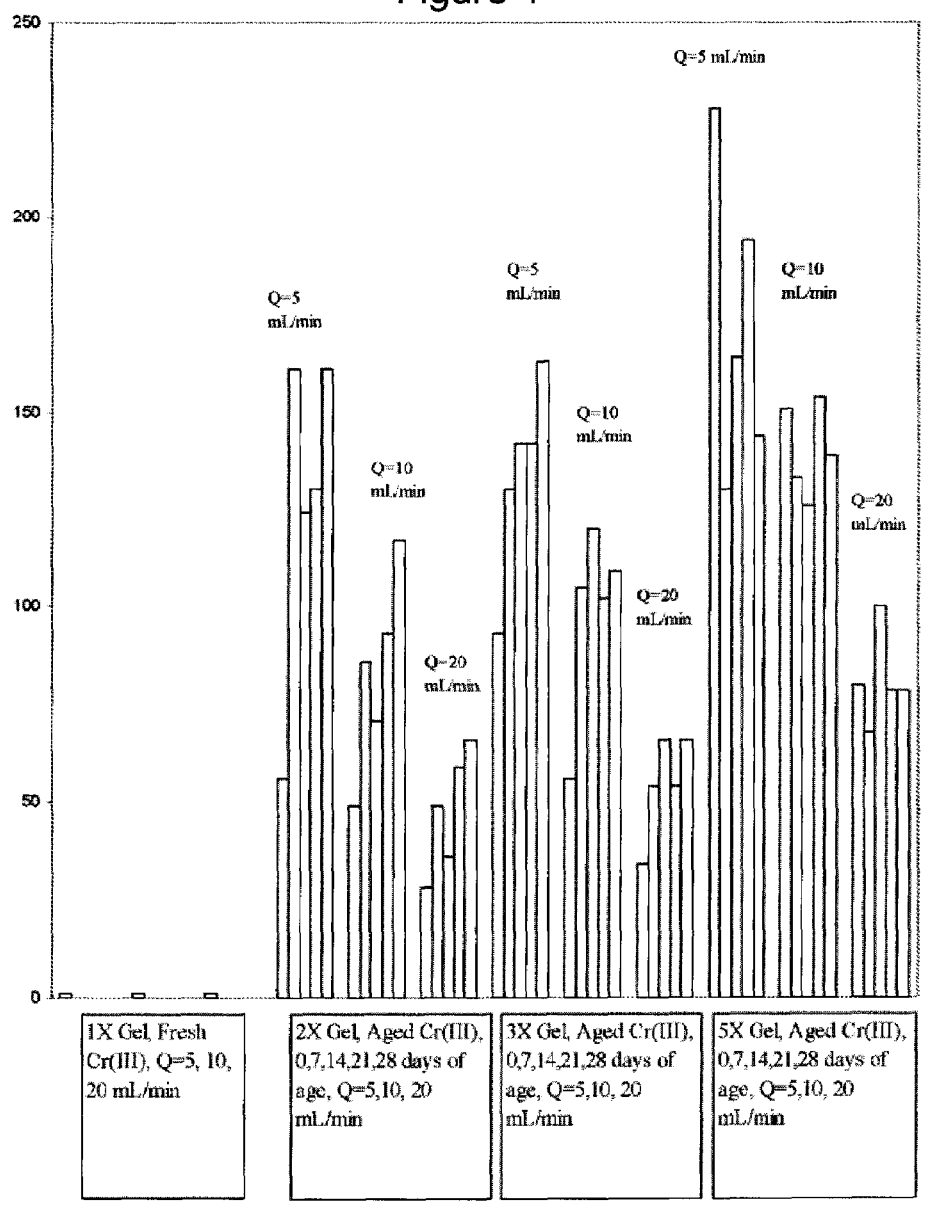
FIG. 4 is a graphical representation of the combined effect of crosslinker aging and overload in accordance with an embodiment of the invention.

In order to determine the optimal age of crosslinker, various periods of aging were investigated. The effect of chromium (III) acetate that has been aged for 1 week, 2 weeks, 3 weeks, 4 weeks and higher was studied with 2×, 3×, and 5× chromium overload gel system. The data presented in Tables 2-4 and FIG. 4 demonstrates the combined effect of crosslinker overload and crosslinker aging on overall gel performance as quantified by the measurement of RRF values.

TABLE 2

2X Gel System

| Cr Age (days) | RRF @ 5 mL/min | RRF @ 10 mL/min | RRF @ 20 mL/min |
|---|---|---|---|
| 7 | 161 | 86 | 49 |
| 14 | 124 | 71 | 36 |
| 21 | 130 | 93 | 59 |
| 28 | 161 | 117 | 66 |
| 38 | 172 | 118 | 90 |
| 67 | 185 | 96 | 57 |
| 93 | 124 | 77 | 45 |

TABLE 3

3X Gel System

| Cr Age (days) | RRF @ 5 mL/min | RRF @ 10 mL/min | RRF @ 20 mL/min |
|---|---|---|---|
| 7 | 130 | 105 | 54 |
| 14 | 142 | 120 | 66 |
| 21 | 142 | 102 | 54 |
| 28 | 161 | 108 | 66 |
| 52 | 185 | 108 | 54 |

TABLE 4

5X Gel System

| Cr Age (days) | RRF @ 5 mL/min | RRF @ 10 mL/min | RRF @ 20 mL/min |
|---|---|---|---|
| 7 | 130 | 133 | 66 |
| 13 | 340 | 185 | 131 |
| 14 | 161 | 130 | 100 |
| 21 | 198 | 154 | 79 |
| 28 | 148 | 145 | 79 |
| 52 | 197 | 154 | 93 |

EXAMPLE 3

Chromium (III) Acetate Pre-Flush Method

This method involved pre-flushing the fracture and adjacent matrix with a solution of chromium (III) acetate. Preferably, the concentration chromium (III) acetate used for pre-flush is equal to or greater than the crosslinker concentration in the gel system. The base gel system is then placed into the fracture. Crosslinker diffusion from the fracture face is reduced because the diffusion between the chromium solution and the brine now takes place within the matrix. Examination of RRF values for the base gel system with various preflush distances was made in order to determine a minimum pre-flush distance that is required to yield the most effective gel performance. The method resulted in a resilient gel that provided significant resistance to flood fluid when waterflood was resumed.

A 1% brine solution was injected through the fracture and the matrix in order to determine the average fracture and matrix permeability. Utilizing a modified Darcy flow equation, the permeabilities were found to be ~5,500 D and ~10 mD, respectively. A 300 ppm chromium (III) acetate solution was used for pre-flushing the apparatus at distances of 0.2 inches, 0.4 inches and 0.6 inches. Pre-flush was performed prior to injecting 10 PV of the 1× base gel. Excess gel was rinsed from the outlets and the gel was allowed to mature for 3 days at 30° C. After this time period, 1% brine was injected into the fracture and the RRF values were determined.

From Table 5, it is evident that pre-flushing the adjacent matrix with crosslinker is a viable means to increasing the performance and stability of the gel in the fracture. Favorable resistance was observed when a pre-flush distance of 0.4 inches into the adjoining matrix preceded the 1× gel placement. However, significant reduction in permeability resulted when a pre-flush distance of 0.6 inches preceded the 1× gel placement.

TABLE 5

| Pre-flush distance (inches) | RRF @ 5 mL/min | RRF @ 10 mL/min | RRF @ 20 mL/min |
|---|---|---|---|
| 0.2 | 15 | 12 | 10 |
| 0.4 | 43 | 37 | 32 |
| 0.6 | 219 | 116 | 58 |

The data shown in Example 1 to 3, demonstrate the capabilities of all three methods for improving gel performance in fractures. Significant reductions in fracture permeability were achieved using any of these methods. These methods can be used separately or in conjunction with each other and can be applied for near wellbore conformance or in-depth gel placement in fractures in the field.

The methods disclosed here can be implemented in the Field by following these steps:

1. preparing separate solutions of polymer and crosslinker, wherein the crosslinker is overloaded, aged, or overloaded and aged according to the invention;
2. mixing the polymer and crosslinker on the surface and injecting the gelling solution in the well, wherein the well is an injection or production well;
3. flushing injection lines with water;
4. shutting the well for few days for gel to form in reservoir; and
5. resuming oil production and/or water injection.

In the case of pre-flush method, a step of pre-flushing reservoir with a crosslinker solution is included before step 2.

Although, these methods have been developed for most common gelling system consisting of polyacrylamide polymers and Cr(III) crosslinker, this invention could be applied to other combination of polymers and crosslinkers known to persons skilled in the science of petroleum engineering.

These methods are useful for any type of wells made in fractured reservoirs and are applicable to both sandstone and carbonate reservoirs.

The invention claimed is:

1. A method of reducing fracture permeability in a downhole formation with a gel formed by reacting a polymer with a Cr(III) cross-linking agent, comprising the steps of:
   a. mixing at surface the polymer with more than a stoichiometric amount of cross-linking agent to form a gel solution;
   b. injecting the gel solution downhole into the formation immediately following mixing so that the gel solution remains in a liquid state during injection; and
   c. allowing the gel solution to set, thereby reducing fracture permeability in the downhole formation.

2. The method of claim 1 wherein the Cr(III) cross-linking agent comprises Cr(III) acetate.

3. The method of claim 1 wherein the more than a stoichiometric amount of cross-linking agent is 2 to 5 times the stoichiometric amount.

4. The method of claim 3 wherein the cross-linking agent is present at a concentration of from 1200 ppm to 3000 ppm.

5. The method of claim 1 wherein the ratio of the concentration of cross-linking agent to polymer is greater than 600: 7500.

6. The method of claim 5 wherein the ratio of the concentration of cross-linking agent to polymer is 1200:7500 or greater.

7. The method of claim 1 wherein the cross-linking agent is aged prior to mixing.

8. The method of claim 7 wherein the cross-linking agent is aged for greater than seven days.

9. The method of claim 7 wherein the cross-linking agent is aged for 7 to 21 days.

10. The method of claim 1 wherein the polymer concentration is about 7500 ppm.

11. The method of claim 1, wherein prior to injecting the gel solution downhole into the formulation, additional cross-linking agent is injected downhole into the formation.

12. A method of reducing fracture permeability in a downhole formation with a gel formed by reacting a polymer with a Cr(III) cross-linking agent, comprising the steps of:
    a. mixing at surface the polymer with more than a stoichiometric amount of cross-linking agent to form a gel solution;
    b. injecting the gel solution downhole into the formation; and
    c. allowing the gel solution to set, thereby reducing fracture permeability in the downhole formation,
    wherein the cross-linking agent is aged prior to mixing.

13. The method of claim 12 wherein the cross-linking agent is aged for greater than seven days.

14. The method of claim 12 wherein the cross-linking agent is aged for 7 to 21 days.

* * * * *